July 3, 1956 E. REBECHINI 2,753,158
FOOD COOKING APPARATUS
Filed April 13, 1953 3 Sheets-Sheet 2
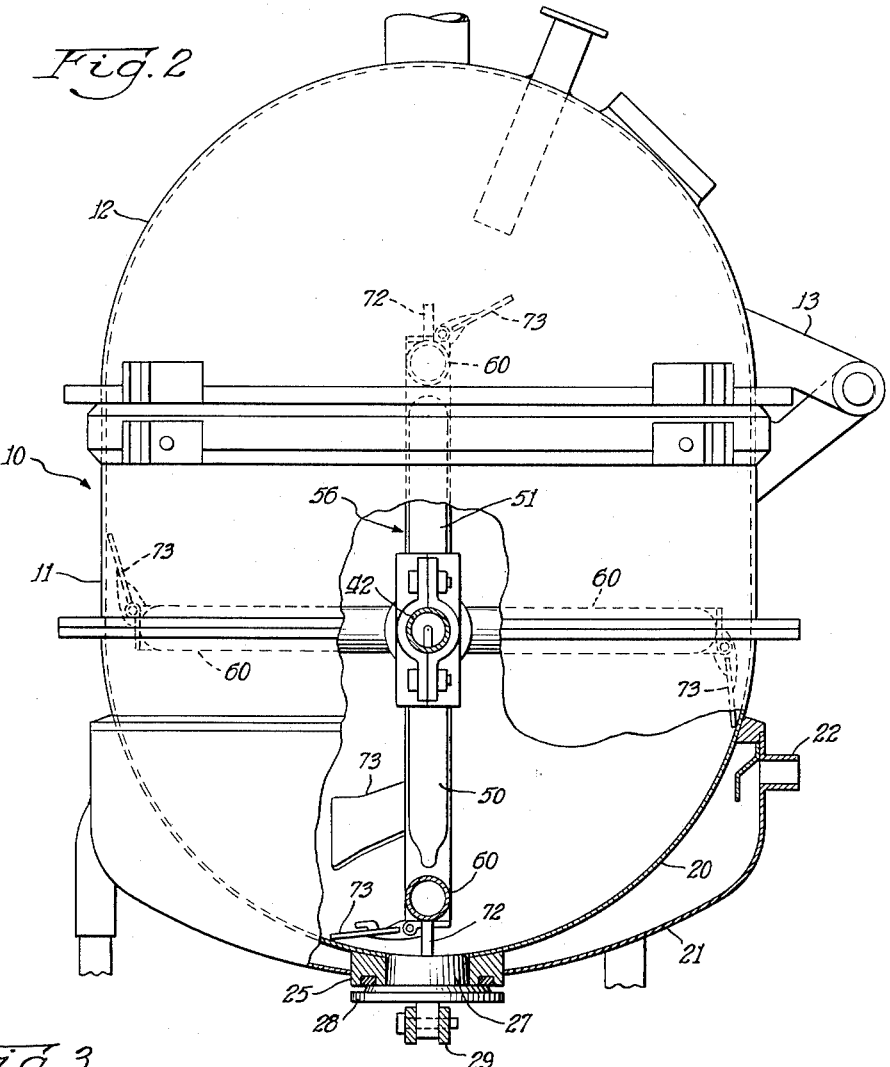
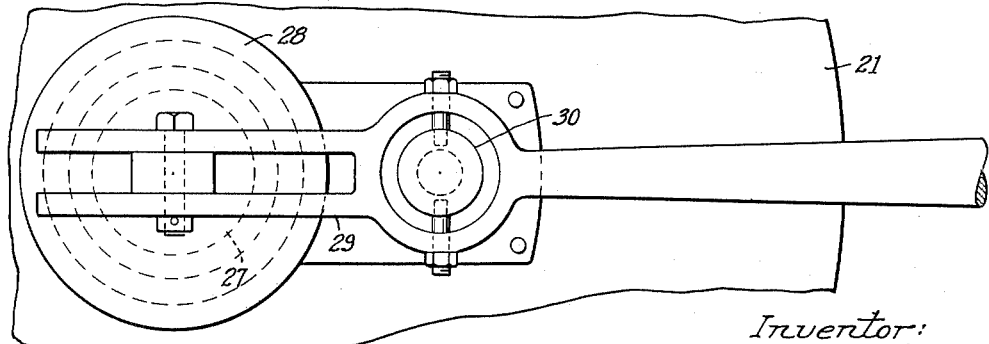
Inventor:
Eugene Rebechini July 3, 1956  E. REBECHINI  2,753,158
FOOD COOKING APPARATUS
Filed April 13, 1953  3 Sheets-Sheet 3
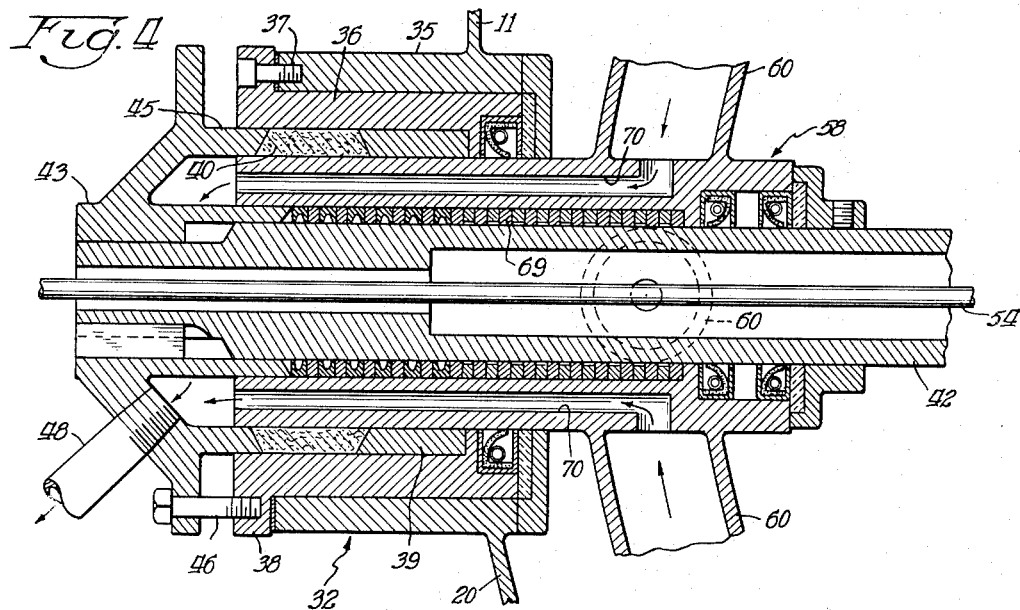
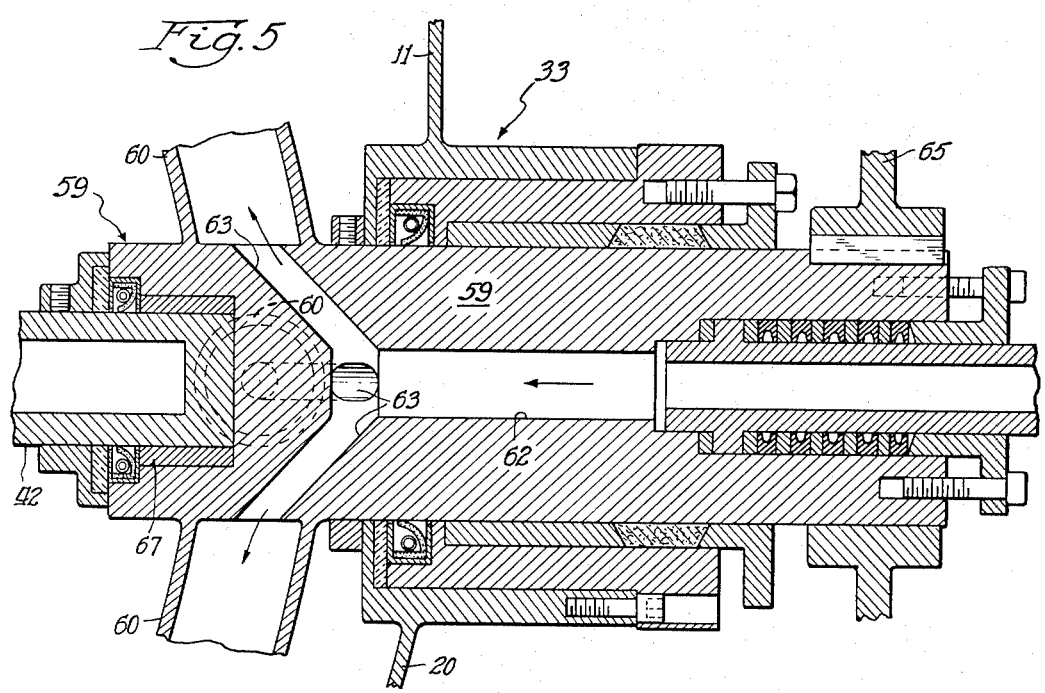
Inventor:
Eugene Rebechini

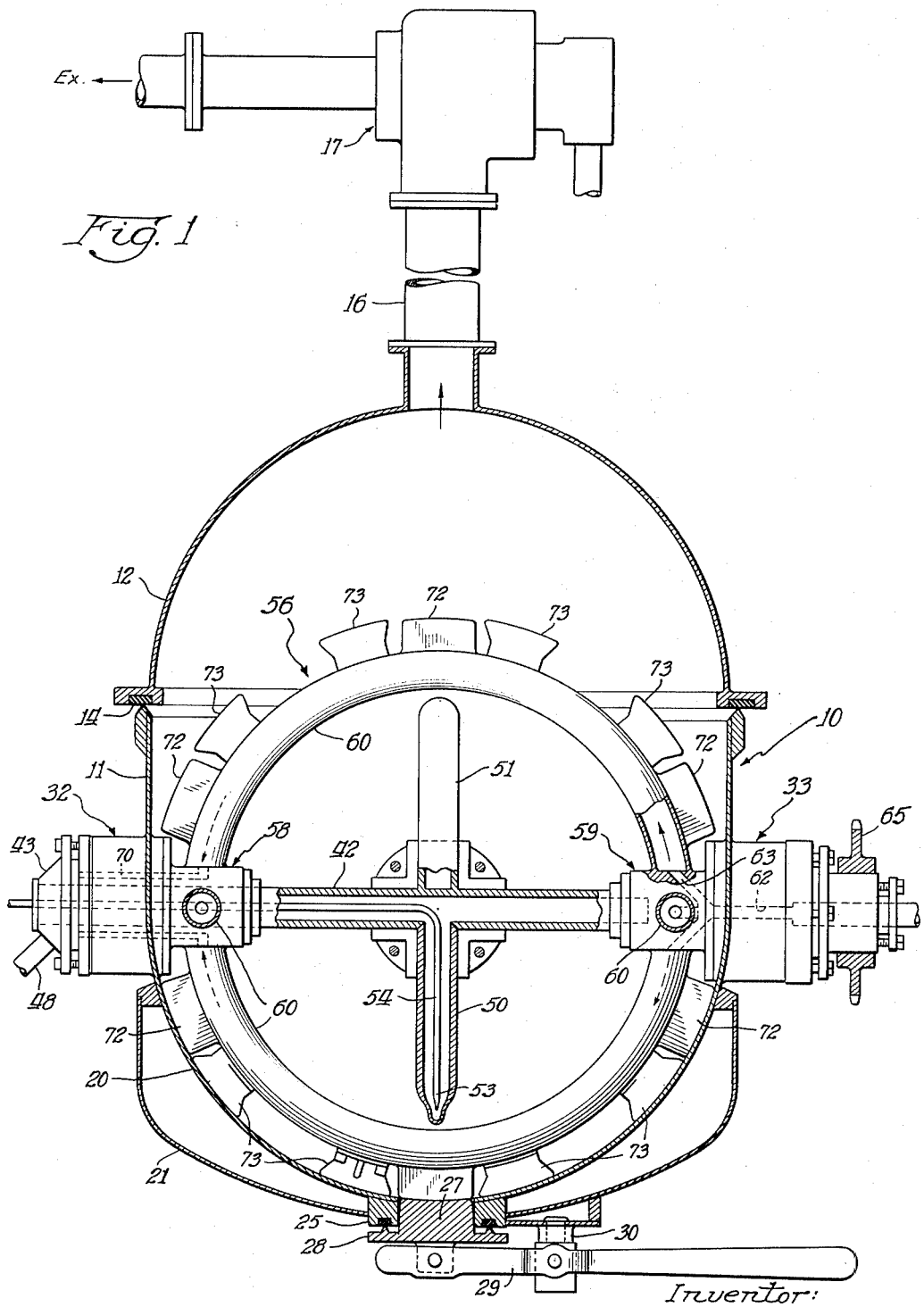

United States Patent Office 2,753,158
Patented July 3, 1956

2,753,158

FOOD COOKING APPARATUS

Eugene Rebechini, Chicago, Ill., assignor to Schutter Candy Company, Chicago, Ill., a corporation of Illinois Application April 13, 1953, Serial No. 348,280

1 Claim. (Cl. 257—78)

My invention relates to a food cooking apparatus and method, and particularly to a vacuum type apparatus and method for commercial cooking.

The apparatus and method of my invention are suitable for cooking various foods, and they are especially suitable for candy cooking. The process of cooking in the case of candy as well as other foods involves the use of heat to drive off all or most of the moisture contained in the raw ingredients.

Typical candy ingredients comprise milk, eggs, sugar, glucose and dextrose, and in the raw state these ingredients include about 30% moisture by weight. The moisture content normally is reduced to about 5% during the cooking process.

Many food materials, particularly those used in candy, are subject to scorching, and therefore the temperatures used during cooking must be maintained as low as possible and be accurately controlled. Since scorching also is a function of cooking time, it is desirable to reduce the cooking time as much as possible. The use of vacuum permits lower temperatures and shorter cooking time, and consequently vacuum cookers have been in use for some time.

Prior vacuum cookers, particularly those designed for cooking candy, utilize a sealed kettle having a steam jacket about its lower portion. A suitable vacuum system is provided to establish sub-atmospheric pressure within the kettle. The food material within the kettle usually is circulated by means of an agitator which rotates back and forth on a vertical axis. The agitator carries spaced and staggered scrapers which contact the interior sides and bottom of the kettle and prevent the material from sticking to the high temperature portions of the kettle.

Such prior cooking apparatus suffers the serious disadvantages that comparatively high temperatures are needed and that cooking is accomplished at a comparatively slow rate. The temperatures and cooking time required are such that it is difficult to avoid a certain amount of scorching, even though a vacuum is used. The vertical axis agitator fails to break up the mass of food material so that the entrained moisture may pass off readily. The region of greatest heat in such apparatus is the lower kettle portion within the steam jacket, and moisture vapor released in this region must bubble up or pass through the entire mass of material before it is available for extraction by the vacuum system. As mentioned, the comparatively high temperatures and prolonged cooking time required by such prior apparatus substantially increases the tendency of the food material to scorch.

One object of my invention, therefore, is to provide a cooking apparatus and method which reduces cooking time by a substantial amount, and thereby reduces or eliminates the tendency to scorch the cooking material.

Another object of the invention is to provide a cooking apparatus and method wherein cooking temperature may be substantially reduced and controlled more accurately than has been possible with prior apparatus and methods.

Another object is to provide cooking apparatus having an agitator which rotates in one direction on a horizontal axis and which is capable of continuously bringing material up from the high temperature lower portion of the kettle to the top where the entrained moisture readily may be extracted by the vacuum system. The agitator is effective to form sheets of high temperature material in the region above the cooking mass. These sheets eventually tend to break up, thus further assisting in the discharge of moisture.

Another object is to provide a cooking apparatus which includes a temperature measuring device located so as to register the temperature existing in the high temperature portion of the cooking material itself. This feature helps make it possible to maintain accurate temperature control during the cooking process.

In brief, my cooking apparatus comprises a sealed kettle having a lower portion defined by a surface of revolution. A conventional steam jacket surrounds this lower kettle portion. Inside the lower kettle portion is disposed an agitator adapted to rotate on a horizontal axis. The agitator has a plurality of spaced hollow pipes or tubes which are shaped to substantially parallel the surface of revolution of the lower kettle portion, and steam is adapted to circulate through these tubes for the purpose of applying heat directly to the kettle interior. The tubes carry spaced and staggered scrapers which engage the interior lower portion of the kettle and prevent material from remaining in contact with the kettle bottom or walls for any length of time.

The temperatures of the steam applied both to the jacket and the agitator tubes are readily controlled with the result that the desired cooking temperature may be accurately established and maintained. During cooking, the agitator revolves continuously in one direction to thereby place the material in a continuous state of circulation. More important, the agitator tubes are effective to move material from the high temperature lower portion of the kettle and to elevate this material in the form of sheets to and above the top of the cooking mass. The sheets tend to break up at the top with the result that the high temperature material is enabled to lose its moisture readily under the influence of the vacuum system.

Other objects, advantages and details of my invention will be apparent as the description proceeds, reference being had to the accompanying drawings wherein one form of apparatus is shown. It will be understood that the description and drawings are illustrative only, and are not to be taken as limiting the invention except insofar as it is limited by the claim.

In the drawings:

Fig. 1 is a front elevational view, partly in section, of cooking apparatus embodying my invention;

Fig. 2 is a side elevational view, partly in section, of the apparatus shown in Fig. 1;

Fig. 3 is a fragmentary bottom view of the apparatus illustrating a discharge valve suitable for use with the apparatus;

Figs. 4 and 5 are sectional views through the respective ends of the agitator and the bearing assemblies in which such ends are journalled.

Referring to Figs. 1–3 of the drawings, cooking apparatus embodying my invention includes a kettle generally designated 10. As illustrated, kettle 10 is constructed in two parts, a body part 11 and a cover 12. The two parts are interconnected by a suitable hinge arrangement 13 (Fig. 2). A seal 14 (Fig. 1) is provided between the two kettle parts.

The upper portion of cover 12 is connected by a flexible pipe 16 to an exhauster means 17 which is effective to establish a sub-atmospheric pressure within the kettle. In general, the lower the pressure used, the faster the cooking process and the lower the required cooking temperature.

The lower portion 20 of kettle body part 11 is defined by a surface of revolution. In the illustrated example, lower portion 20 is substantially hemispheric in shape, although other shapes are of course possible.

Lower kettle portion 20 is surrounded by a steam jacket 21, the latter being adapted to receive steam of predetermined pressure and temperature through an inlet 22 (Fig. 2).

The bottom of steam jacket 21 is apertured to receive an annular member 25 which has its inner end attached to bottom portion 20 of the kettle. The latter is apertured in alignment with the opening in member 25 to provide a discharge orifice.

The discharge orifice is closed by means of a plug 27 carried on a plate 28 which makes a sealed engagement with the outer end of annular member 25. Plate 28 is pivoted to a lever 29 which in turn is pivoted to a bracket 30 carried by jacket 21. Manipulation of lever 29 opens and closes the discharge orifice.

A pair of oppositely disposed fixed bearing assemblies 32 and 33 are carried by kettle part 11 at the top of lower portion 20. Looking at Fig. 1, bearing assembly 32 is at the left and bearing assembly 33 is at the right. The bearing assemblies are respectively shown in detail in Figs. 4 and 5.

Referring to Fig. 4, left hand bearing assembly 32 comprises a cylindrical sleeve 35 set into a circular opening in kettle part 11 at the top of lower portion 20. A second sleeve 36 telescopes sleeve 35 and is secured to the latter by means of bolts 37 extending through a flange 38. A bearing ring 39 of bronze or the like and packing 40 are disposed about the interior of sleeve 36.

A fixed shaft 42, still referring to Fig. 4, extends horizontally through bearing assembly 32 and substantially across the interior of the kettle, as shown in Fig. 1. Shaft 42 normally is hollow, as shown, and its outer diameter is somewhat less than the inner diameter of bearing ring 39.

The end of shaft 42 exterior of the kettle has secured thereto a cap 43 which projects radially beyond the circumference of the shaft. Cap 43 terminates in a cylindrical portion 45 which telescopes sleeve 36 of bearing assembly 32, as shown in Fig. 4. The aforesaid packing 40 is confined between cap portion 45 and bearing ring 39, in the example shown. Cap 43 is secured to the outer face of bearing assembly 32 by a plurality of bolts 46. However, other suitable means may be employed for anchoring cap 43 to some fixed part of the apparatus.

Cap 43 contains an aperture from which a pipe 48 extends. Pipe 48 forms a steam exit, as will be seen.

As previously mentioned, fixed shaft 42 extends substantially across the kettle interior, and in particular, it extends at least to the center of the kettle. At the kettle center, shaft 42 has a pair of oppositely extending projections 50 and 51 (Fig. 1) which are disposed generally on the vertical axis of the kettle. Downwardly extending projection 51 normally is hollow with its interior in communication with the hollow interior of shaft 42, as shown in Fig. 1. A temperature measuring device 53 is located in the bottom of projection 50 and a connection 54 extends upwardly through projection 50 and laterally through shaft 42 to an indicating device (not shown) located exteriorly of the kettle.

Being stationary, projections 50 and 51 function as breaker elements to break up the cooking material as it is circulated by the presently to be described agitator.

Bearing assembly 33 (Figs. 2 and 5) is a substantial duplicate of the previously described bearing assembly 32, and hence will not be described in detail.

An agitator 56 adapted to rotate on a horizontal axis is disposed within kettle 10. Agitator 56 includes end members 58 and 59 which are respectively journalled in bearing assemblies 32 and 33. End members 58 and 59 are connected to each other by means of a plurality of imperforate hollow tubes 60, there being four equally spaced tubes 60 used in the illustrated form of the invention.

Tubes 60 are shaped to substantially parallel the surface of revolution which defines lower kettle portion 20, and in the example shown they are semi-circular in shape. The circular radius of tubes 60 is such that they move in spaced relation to lower kettle portion 20 as the agitator revolves.

Referring to Fig. 5, agitator end member 59 contains a central passageway 62 which branches into radially extending passageways 63, one radial passageway 63 leading to each tube 60. Steam of predetermined pressure and temperature is admitted through passageways 62 and 63 into the several tubes 60 so that the latter may provide a source of cooking heat located centrally of the cooking mass.

A sprocket wheel 65 (Figs. 1 and 5) is keyed to a portion of agitator end member 59 which extends exteriorly of bearing assembly 33. A suitable motor and drive chain (not shown) are provided to drive sprocket wheel 65 and thus the agitator.

The combination of bearing assembly 33 and agitator end member 59 includes a plurality of seals and lubrication elements which are conventional and do not need to be described in detail.

In the apparatus illustrated, fixed horizontal shaft 42 has its end within kettle 10 journalled in a bearing 67 carried by agitator end member 59, as shown in Fig. 5.

Agitator end member 58 (Fig. 4), the left hand end member, is generally cylindrical in shape. Its outer surface is journalled in bearing ring 39 and packing 40 of bearing assembly 32 and in portion 45 of cap 43. The inner surface of end member 58 is journalled on the exterior of shaft 42, suitable bearing and sealing elements 69 being provided between the shaft exterior and the inner surface of end member 58. End member 58 has passageways 70 which extend from the ends of tubes 60 longitudinally of the end member to a point of discharge within cap 43. Steam travelling through tubes 60 and passageways 70 is discharged to atmosphere or to a suitable collector through the previously mentioned exit pipe 48.

Agitator pipes 60 carry spaced stationary scrapers 72 and flexible scrapers 73. As between the various tubes 60, the scrapers 72 and 73 are staggered so that all interior surface areas of lower kettle portion 20 will be scraped as agitator 56 revolves. The shape and disposition of the scrapers 72 and 73 are such that material adhering to bottom portion 20 of the kettle will be dislodged and move from side to side. Thus, no material adjacent the high temperature bottom surface of the kettle is allowed to remain in one place for any length of time.

As agitator 56 revolves, the tubes 60 and the scrapers carried thereby function to physically lift the material adjacent the kettle bottom to a position at the top of the cooking mass. Maximum heat in the apparatus is present at the bottom of the kettle due to the corresponding location of the steam jacket, and it is highly important that the material in the maximum heat region be removed therefrom both to prevent scorching and to enable the entrained moisture to readily pass off under the influence of the vacuum system. As the material is lifted from the kettle bottom, it has the tendency to form a thin sheet which is physically separated from the body of the cooking mass and which is elevated above the mass. The sheet either disintegrates because of its own physical properties or it is broken up on engagement with projection 51. In either case the high temperature elevated material is positioned and conditioned by agitator 56 for rapid release of entrained moisture.

As previously mentioned, cooking time is a direct function of the rate of moisture release.

In addition to the apparatus above described, my invention also resides in the cooking method I have employed. In brief, this phase of the invention contemplates cooking material in a sealed kettle, and it comprises the steps of applying heat of predetermined temperature to the exterior of the lower kettle portion, applying heat of predetermined temperature to regions within the kettle, establishing sub-atmospheric pressure within the kettle, continuously scraping material from the interior sides and bottom of the lower kettle portion, and agitating the material in such a manner that material from the bottom is continuously brought to the top in the form of sheets.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

Cooking apparatus comprising a kettle having a lower portion defined by a surface of revolution, a pair of oppositely disposed, fixed bearing assemblies carried by said kettle at the top of said lower portion, a non-rotatable shaft extending horizontally through one of said bearing assemblies and continuing at least to the vertical axis of said kettle, the end of said shaft exterior of the kettle being attached adjacent the outer end of said one bearing assembly, said shaft having an upward projection disposed generally on the vertical axis of the kettle, an agitator within said kettle having end members journalled in said bearing assemblies and a plurality of imperforate hollow tubes each extending between said end members in a plane including said shaft, said hollow tubes each being shaped to substantially parallel the said surface of revolution in spaced relation therewith, spaced and staggered scrapers carried by said hollow tubes and adapted to engage the interior lower portion of said kettle, said agitator end members having passageways communicating with said hollow tubes, the passageways in one end member forming a steam inlet and the passageways in the other end member forming a steam outlet, and means rotating said agitator in one direction.

References Cited in the file of this patent

UNITED STATES PATENTS

| | | |
|---|---|---|
| 563,860 | Hopkins | July 14, 1896 |
| 1,088,113 | Valerius | Feb. 24, 1914 |
| 1,162,108 | Schlueter | Nov. 30, 1915 |
| 1,365,916 | Horstmann | Jan. 18, 1921 |
| 1,607,345 | Harding et al. | Nov. 16, 1926 |
| 1,694,452 | Sangster | Dec. 11, 1928 |
| 1,727,444 | Prescott et al. | Sept. 10, 1929 |
| 1,734,824 | Offenhauser | Nov. 5, 1929 |
| 1,844,347 | Chapman | Feb. 9, 1932 |
| 2,378,950 | Reich | June 26, 1945 |
| 2,448,538 | Mason | Sept. 7, 1948 |
| 2,513,254 | Savage et al. | June 27, 1950 |
| 2,540,250 | Feldstein et al. | Feb. 6, 1951 |
| 2,558,294 | Finizie | June 26, 1951 |
| 2,585,767 | Guggenheim et al. | Feb. 12, 1952 |

FOREIGN PATENTS

| | | |
|---|---|---|
| 627,384 | Great Britain | Aug. 8, 1949 |